United States Patent
Nishi et al.

[11] Patent Number: 5,934,728
[45] Date of Patent: Aug. 10, 1999

[54] MULTI-PURPOSE VEHICLE

[76] Inventors: Takahiro Nishi; Masako Kiyota, both of 1-2-11 Shinmachi, Kumamoto-Shi, Kumamoto-ken, Japan

[21] Appl. No.: 08/954,665

[22] Filed: Oct. 20, 1997

[30] Foreign Application Priority Data

Oct. 22, 1996 [JP] Japan .................................. 8-298177
Aug. 11, 1997 [JP] Japan .................................. 9-228884

[51] Int. Cl.$^6$ ............................................. B62D 33/08
[52] U.S. Cl. ............................................. 296/26.15
[58] Field of Search .................................. 296/26.15

[56] References Cited

U.S. PATENT DOCUMENTS

| | | | |
|---|---|---|---|
| 1,965,451 | 7/1934 | Brown | 296/26.15 |
| 3,737,191 | 6/1973 | Fackre | 296/26.15 |
| 5,711,566 | 1/1998 | Lesmeister et al. | 296/26.15 |

*Primary Examiner*—Gary C. Hoge
*Attorney, Agent, or Firm*—Steinberg & Raskin, P.C.

[57] ABSTRACT

Multi purpose vehicle in which the area of a floor on the vehicle such as a deck is increased when necessary to use it as a multi-purpose space without interfering with normal traveling. To this end, the vehicle has a configuration in which when a traction floor plate is pulled out, several floor plates are sequentially pulled out, starting with one extreme floor plate, through linkage mechanisms to spread the floor plates in the form of a fan.

16 Claims, 8 Drawing Sheets

MULTI-PURPOSE VEHICLE

BACKGROUND OF THE INVENTION

1. Field of the Invention

The present invention relates to a multi-purpose vehicle in which the floor area of a deck or the like is increased to use it as a multi-purpose space.

2. Description of the Related Art

For example, the use of a deck of a truck has been substantially limited to carrying a cargo because it has a limited area due to limitations placed thereon for the reasons of traveling functions.

It is an object of the present invention to provide a multi-purpose vehicle in which the floor area of a deck or the like can be increased to use it as a multi-purpose space when needed without interference with normal traveling.

SUMMARY OF THE INVENTION

According to a first aspect of the present invention, there is provided a multi-purpose vehicle characterized in that it comprises:

a rotating or fixed shaft mounted vertically to a floor of the vehicle such as a deck;

first through n-th floor plates (n≧1) which are each rotatably coupled to the rotating or fixed shaft and are stacked on the floor;

a traction floor plate which is fixedly or rotatably coupled to the rotating or fixed shaft and is stacked on top of the uppermost n-th floor plate; and linkage mechanisms for linking a floor plate with the floor plate thereunder to pull out the latter when the former is pulled out by a predetermined amount, and in that when the traction floor plate is pulled out, the first through n-th floor plates are sequentially pulled out through the linkage mechanism beginning with the n-th floor plate to spread those floor plates in the form of a fan.

According to a second aspect of the invention, there is provided a multi-purpose vehicle characterized in that it comprises:

a rotating or fixed shaft mounted vertically between a floor of the vehicle such as a deck and a ceiling facing the floor;

first through n-th box elements (n≧1) which are each rotatably coupled to the rotating or fixed shaft and are contained inside the floor and the ceiling in an overlapping relationship;

a traction box element which is fixedly or rotatably coupled to the rotating or fixed shaft and is contained inside the innermost n-th box in an overlapping relationship; and linkage mechanisms for linking a box element with the outer box element next thereto to pull out the latter when the former is pulled out by a predetermined amount, and in that when the traction box element is pulled out, the first through n-th box elements are sequentially pulled out telescopically beginning with the n-th box element through the linkage mechanism to spread those box elements in the form of a fan.

According to a third aspect of the invention, there is provided a configuration according to the first or second aspect, characterized in that a pair of fixed or rotating shafts are provided in positions which are symmetric about the center line extending along the left and right sides of the floor or about the center of the floor and in that floor plates or box elements coupled to the rotating or fixed shafts are spread in the form of fans to the left and right, respectively.

BRIEF DESCRIPTION OF THE DRAWINGS

FIG. 2a shows a first floor plate 4R, and FIG. 2b shows a first floor plate 4L.

DETAILED DESCRIPTION OF PREFERRED EMBODIMENTS

A multi-purpose truck according to a first embodiment of the present invention will now be described with reference to FIGS. 1 through 7.

A pair of symmetrically arranged fixed shafts 3L and 3R are mounted vertically to the front corners of a rectangular deck 2 which is connected to a vehicle body 1.

First floor plates 4 (4L and 4R) are rotatably coupled to the pair of fixed shafts 3L and 3R.

Figure 2A:
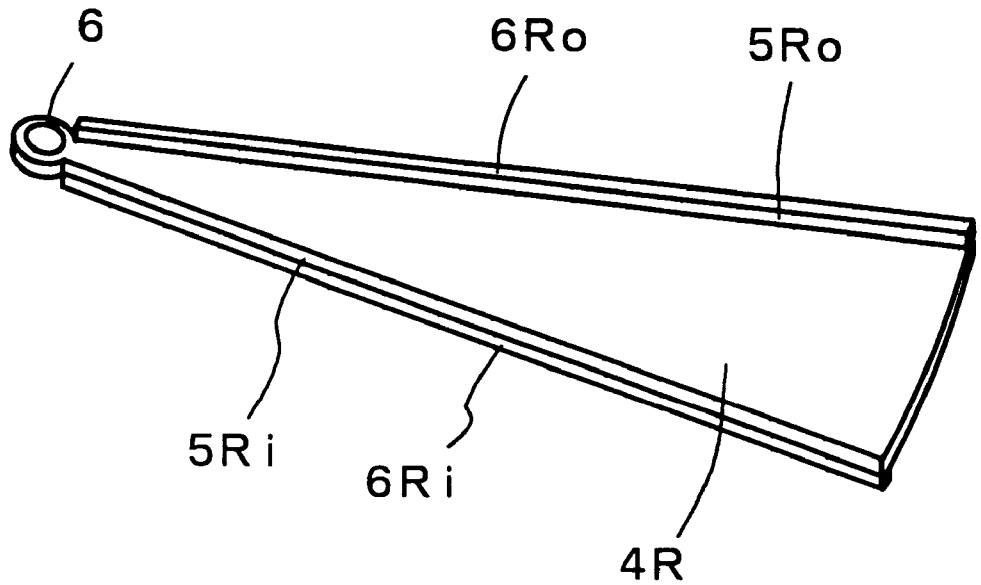
FIGS. 2a and 2b are perspective views of first floor plates 4.

As shown in FIG. 2a, the first floor plate 4R comprises a fan-shaped plate having two sides 5Ro and 5Ri of the same length. A ring portion 6 is provided on an apex portion formed by the two sides 5Ro and 5Ri, and the floor plate is rotatably coupled to the fixed shaft 3R through the ring portion 6. Further, there is provided a linkage wall 6Ro which extends upwardly along the outer side 5Ro and a linkage wall 6Ri which extends downwardly along the inner side 5Ri.

Figure 2B:
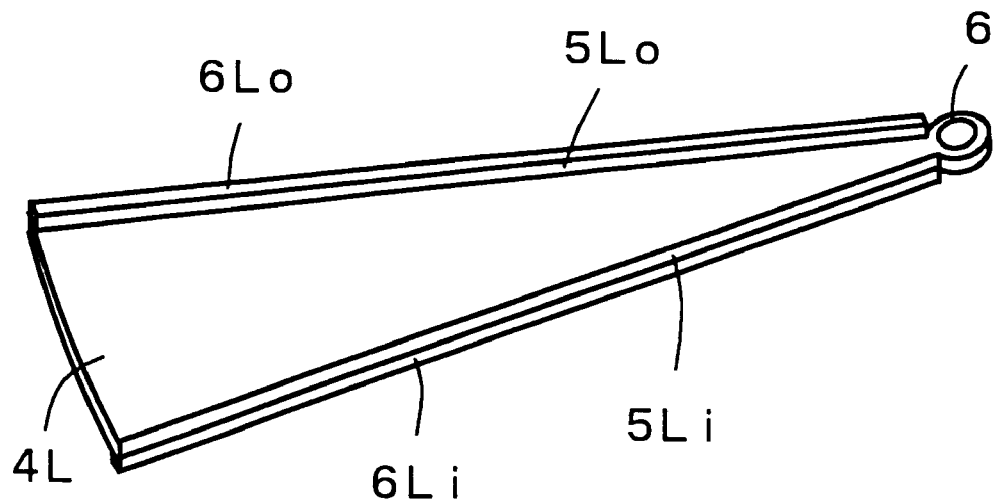

As shown in FIG. 2b, the first floor plate 4L also comprises a fan-shaped plate similar to the first floor plate 4R, and is rotatably coupled to the fixed shaft 3L through a ring portion 6 provided thereon. There is provided a linkage wall 6Lo which extends upwardly along an outer side 5Lo and a linkage wall 6Li which extends downwardly along an inner side 5Li.

Figure 3:
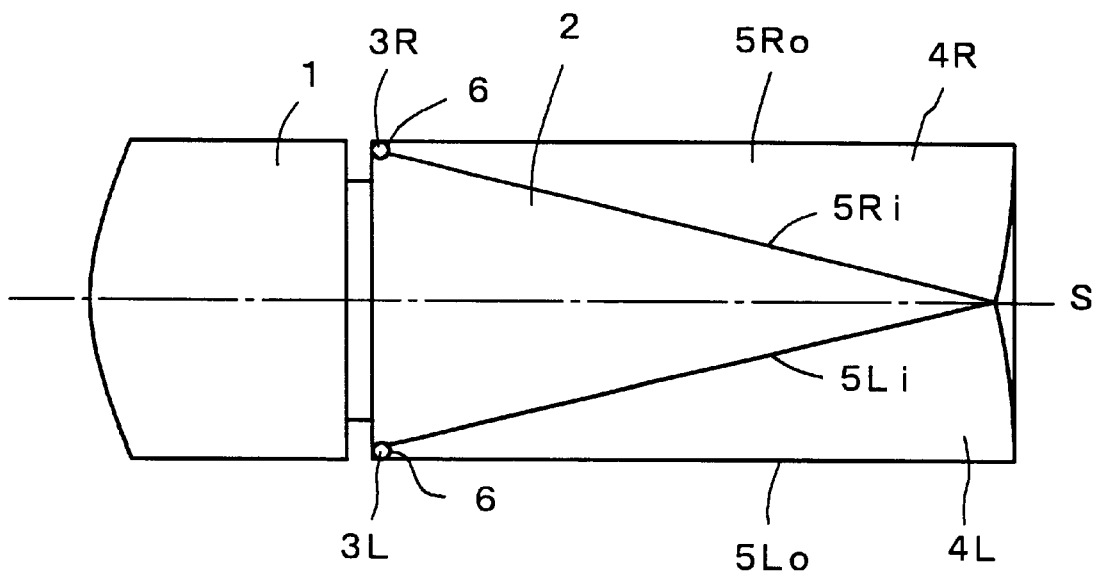
FIG. 3 is a view showing the first floor plates 4L and 4R placed on a deck 2.

When the pair of first floor plates 4L and 4R are placed on the deck 2, as shown in FIG. 3, the respective outer sides 5Lo and 5Ro are positioned along the longer left and right sides of the deck 2, and the ends of the respective inner sides 5Li and 5Ri face each other on the center line S extending along the longer sides of the deck 2.

The lengths of the sides 5Lo, 5Li, 5Ro and 5Ri are chosen such that the ends of the outer sides 5Lo and 5Ro are located inside the rear end of the deck 2. Thus, when the first floor plates 4L and 4R are rotated about the fixed shafts 3L and 3R, the loci of the rotation will not exceed the rear edge of the deck 2 because the two sides of the first floor plates 4L and 4R are equal in length.

Second floor plates 7 (7L and 7R) and third floor plates 8 (8L and 8R) in the same fan-like configuration as the first floor plates 4L and 4R are stacked on the first floor plates 4L and 4R arranged as described above. The second floor plates 7L and 7R and the third floor plates 8L and 8R are also rotatably coupled to the respective fixed shafts 3L and 3R through ring portions 6 provided on the apex portions thereof and are placed on the deck 2 like the first floor plates 4L and 4R.

Linkage walls 6Lo, 6Li, 6Ro and 6Ri like those of the first floor plates 4L and 4R are provided on the second floor plates 7L and 7R and the third floor plates 8L and 8R.

Figure 4:
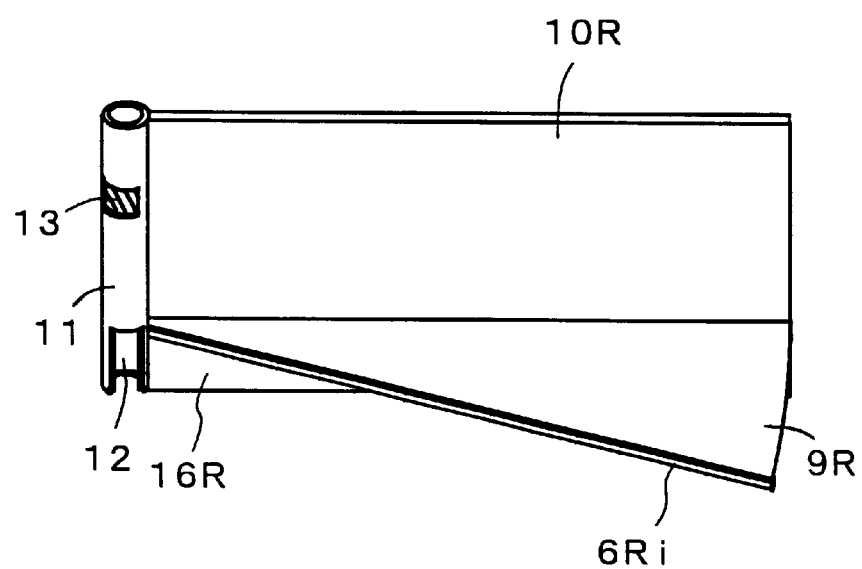
FIG. 4 is a perspective view showing a traction floor plate 9R from among traction floor plates 9L and 9R.

Further, traction floor plates 9 (9L and 9R) as shown in FIG. 4 are stacked on the uppermost third floor plates 8L and 8R. These traction floor plates 9L and 9R also comprise a fan-shaped plate like the first, second and third floor plates 4, 7 and 8 and have downward linkage walls 6Li and 6Ri along the respective inner walls.

They are formed with side walls 10L and 10R on the respective outer sides thereof. Only the traction floor plates 9L and 9R are rotatably coupled to the fixed shafts 3L and 3R through cylindrical portions 11 provided on the front ends of the side walls 10L and 10R.

Figure 5:
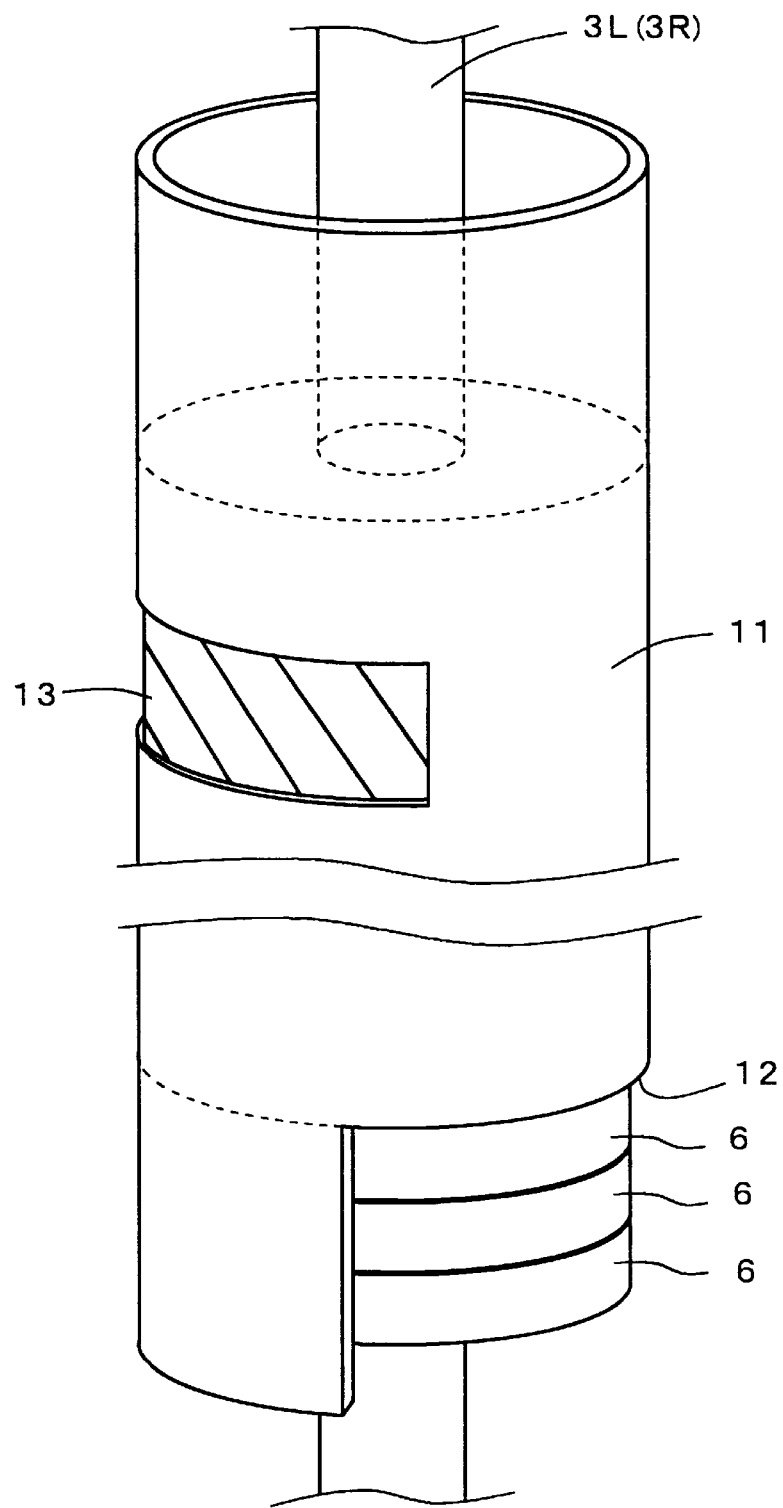
FIG. 5 is a view showing the relationship between fixed shafts 3L and 3R, a cylindrical portion 11, and a ring portion 6.

As shown in FIG. 5, the cylindrical portions 11 are rotatably coupled to the fixed shafts 3L and 3R in the middle thereof and are formed with receptacle portions 12 having an inner diameter substantially equal to the outer diameter of the ring portions 6 of the first, second and third floor plates 4, 7 and 8 at the lower ends thereof.

The ring portions 6 are contained in the receptacle portions 12 in an overlapping relationship, and the receptacle portions 12 are partially cut away over a predetermined angle and to a predetermined height such that they do not interfere with the motion of the first, second and third floor plates 4, 7 and 8.

The cylindrical portions 11 are formed with screw gears 13 on the outer circumferential surface thereof. Further, although not specifically shown, a hydraulic motor as a driving source is loaded in a predetermined location of this multi-purpose truck. Worms to which the output of the hydraulic motor is transmitted are engaged with the screw gears 13 on the cylindrical portions 11.

Thus, the worms rotate in response to the output of the hydraulic motor transmitted through a reducer. The rotation of the worms rotates the cylindrical portions 11 through the screw gears 13, thereby moving the traction floor plates 9L and 9R.

Although the output of the hydraulic motor is transmitted to the cylindrical portions 11 through the worms and screw gears 13 here, a configuration may be employed wherein the output is transmitted through a chain mechanism or the like.

Further, the driving source is not limited to a hydraulic motor and a hydraulic cylinder, electric motor or the like may be used.

The operation of the multi-purpose truck of the first embodiment will now be described.

This multi-purpose truck can be driven normally without any difference from a normal truck when the first, second and third floor plates 4, 7 and 8 are stacked on the deck 2 and the traction floor plates 9L and 9R are stacked on the third floor plates 8L and 8R.

When the hydraulic motor which is not shown is driven after the truck stops at the destination, as previously described, the cylindrical portions 11 are rotated to pull out the pair of left and right traction floor plates 9L and 9R.

Figure 6:
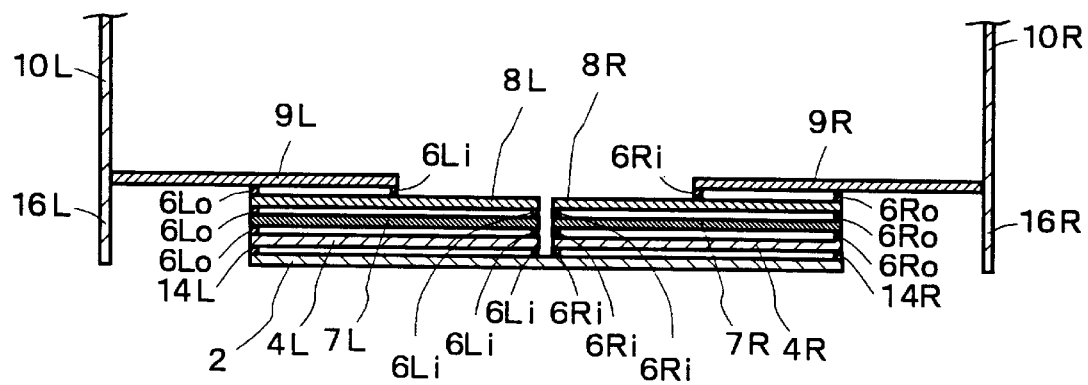
FIG. 6 is a sectional view taken along a line extending along the shorter sides of the deck 2.

As already mentioned, the downward linkage walls 6Li and 6Ri are provided on the inner sides of the traction floor plates 9L and 9R as shown in FIG. 6. Further, the upward linkage walls 6Lo and 6Ro are provided on the outer sides of the third floor plates 8L and 8R.

Therefore, when the traction floor plates 9L and 9R are pulled out by a predetermined amount, the respective linkage walls 6Li and 6Ri abut the respective linkage walls 6Lo and 6Ro of the third floor plates 8L and 8R to pull out the third floor plates 8L and 8R.

Similarly, the downward linkage walls 6Li and 6Ri are provided on the inner sides of the third floor plates 8L and 8R. Further, the upward linkage walls 6Lo and 6Ro are provided on the outer sides of the second floor plates 7L and 7R.

Therefore, when the third floor plates 8L and 8R are pulled out by a predetermined amount, the respective linkage walls 6Li and 6Ri abut the respective linkage walls 6Lo and 6Ro of the second floor plates 7L and 7R to pull out the second floor plates 7L and 7R.

Thus, when the hydraulic motor is driven to pull out the traction floor plates 9L and 9R, the first, second and third floor plates 4, 7 and 8 are sequentially pulled out beginning with the third floor plates 8 in a tractive manner to be spread in the form of a fan. Finally, they will not be spread any more when the linkage walls 6Li and 6Ri provided on the inner sides of the first floor plates 4L and 4R come to positions where they abut stopper walls 14L and 14R provided on the left and right longer sides of the deck 2 as shown in FIG. 1.

In the present embodiment, the linkage mechanism according to the present invention is formed by the combination of the linkage walls 6Li, 6Lo, 6Ri and 6Ro and the stopper walls 14L and 14R.

Figure 1:
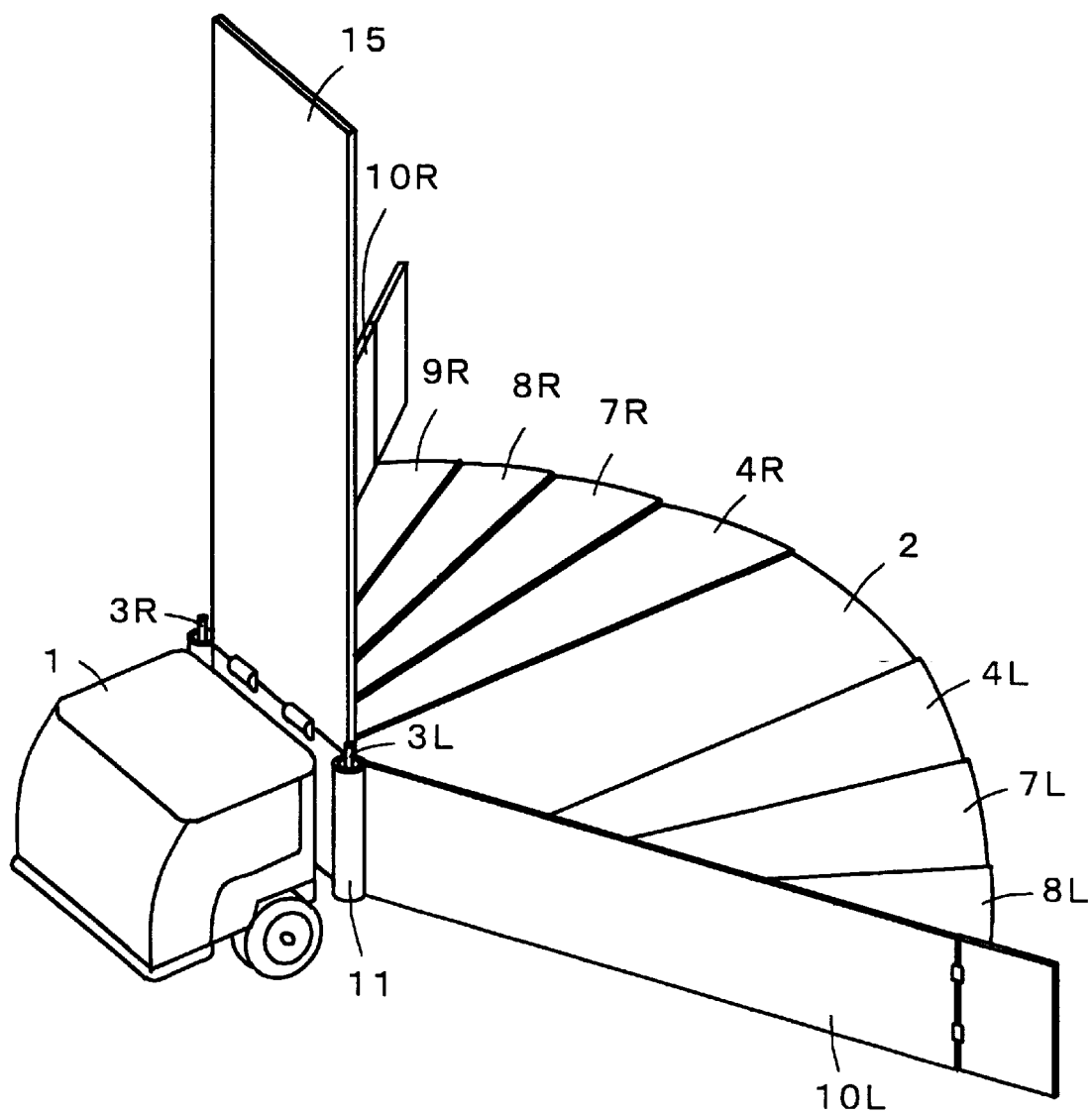
FIG. 1 is a view showing floor plates spread in the form of a fan of a multi-purpose truck according to a first embodiment of the present invention.

When a ceiling 15 is provided, the ceiling may be made vertically openable as shown in FIG. 1 and may be closed during a travel by a hydraulic cylinder which is not shown and opened when the floor plates are spread.

The floor plates 4, 7, 8 and 9 can be retracted from the spread state as shown in FIG. 1 by driving the hydraulic motor to move the pair of left and right traction floor plates 9L and 9R inwardly.

As shown in FIG. 6, the lower ends of the side walls 10L and 10R provided on the traction floor plates 9L and 9R are extended below the traction floor plates 9L and 9R, and such extended portions constitute urging portions 16L and 16R. Thus, when the traction floor plates 9L and 9R are moved inwardly by a predetermined amount, the urging portions 16L and 16R urge the surfaces of the outer sides of the third floor plates 8L and 8R to move the third floor plates 8L and 8R inwardly.

Similarly, the second floor plates 7L and 7R and the first floor plates 4L and 4R are urged by the urging portions 16L and 16R to be sequentially moved inwardly and, finally, all of the floor plates 4, 7, 8 and 9 are retracted onto the deck 2.

Although not specifically shown, roller mechanisms may be interposed between the floor plates 4, 7, 8 and 9 in an overlapping relationship to reduce friction, which allows the floor plates 4, 7, 8 and 9 to be moved smoothly.

The multi-purpose truck according to the first embodiment of the invention as described above can offer a larger area which can be used as a space for various purposes, e.g., as a simple stage by spreading the floor plates 4, 7, 8 and 9.

The truck can travel normally without any interference by the floor plates 4, 7, 8 and 9 when they are retracted onto the deck 2.

Figure 7:
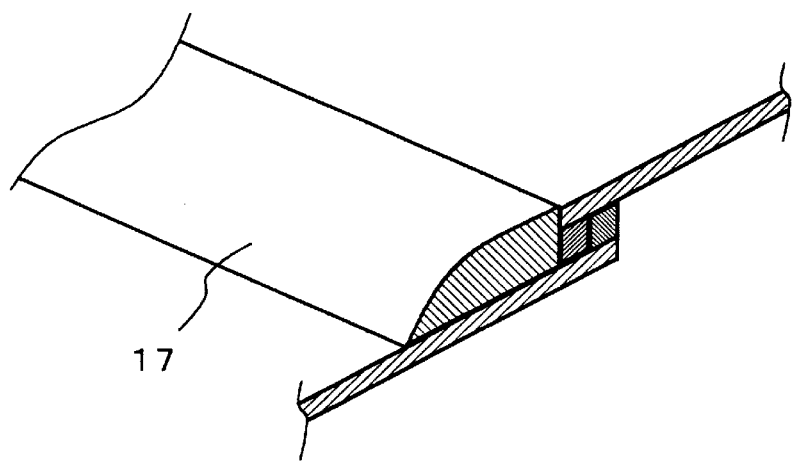
FIG. 7 is a perspective view of a region where the floor plates overlap with each other.

When the floor plates are spread in the form of a fan, in the regions where the floor plates 4, 7, 8 and 9 overlap, steps corresponding to the thickness of the floor plates are formed. An edge member 17 made of rubber or the like may be prepared in advance and provided at such a step as shown in FIG. 7.

Further, although not shown, jacks may be prepared and provided under the spread floor plates 4, 7, 8 and 9 at appropriate intervals to maintain strength required for a multi-purpose space.

During use as a simple stage or the like, a light and pipes and the like for mounting the same may be provided on the back side of the ceiling 15 to achieve an additional advantage in that time and labor for setting a stage can be saved.

A multi-purpose truck according to a second embodiment of the present invention will now be described with reference to FIGS. 8 through 10.

The second embodiment employs a configuration wherein traction box elements and first and second box elements, instead of floor palates, are pulled out telescopically to be spread in the form of a fan. However, the configuration is basically the same as that in the first embodiment, and the following description will therefore be focused on differences therebetween.

First box elements 18 (18L and 18R) are rotatably coupled respectively to a pair of fixed shafts 3L and 3R which are vertically mounted to a deck 2 and a ceiling 15.

Figure 9:
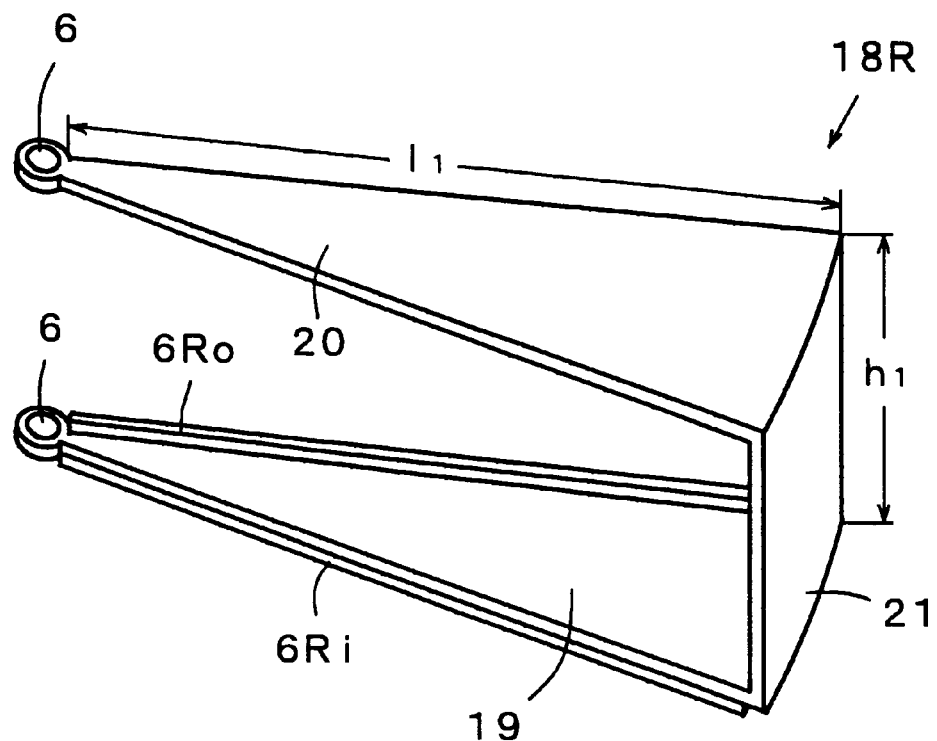
FIG. 9 is a perspective view showing a first box element 18R from among first box elements 18L and 18R.

As shown in FIG. 9, a floor plate 19 and a ceiling plate 20 of the first box element 18R are constituted by a fan-shaped plate having two sides in the same length. A rear wall 21 is provided at the rear ends of the floor plate 19 and the ceiling plate 20 that face each other.

The length $l_1$ of the sides of the fan-shaped plates is shorter than the length l of the longer sides of the deck 2 and the ceiling 15 (see FIG. 8) by a predetermined amount. Further, the height $h_1$ between the floor plate 19 and the ceiling plate 20 is also smaller than the height h between the deck 2 and the ceiling 15 (see FIG. 8) by a predetermined amount.

The first box element 18R is rotatably coupled to the fixed shaft 3R through ring portions 6 provided on apex portions of the floor plate 19 and the ceiling plate 20. Since the length $l_1$ of the fan-shaped plates and the height $h_1$ between the floor plate 19 and the ceiling plate 20 are set as described above, the first box element 18R can be contained inside the deck 2 and the ceiling 15.

The first box element 18R is similar to the first floor plate 4R in the first embodiment in that it includes linkage walls 6Ri and 6Ro on the floor plate 19.

Since the first box element 18L is similar to the above-described first box element 18R, no detailed description will be made for the same.

Second box elements 22 (22L and 22R) are contained inside the first box elements 18L and 18R in an overlapping relationship.

Although not specifically shown, the second box elements 22 also have a floor plate and a ceiling plate constituted by fan-shaped plates and a rear wall provided at the ends of the floor plate and the ceiling plate that face each other.

The second box elements 22L and 22R are also rotatably coupled to the fixed shafts 3L and 3R through ring portions 6 provided on apex portions of the respective floor plates 19 and ceiling plates 20.

The length $l_2$ of the sides of the floor plates and the ceiling plates of the second box elements 22L and 22R is shorter than the length $l_1$ of the sides of the floor plates 19 and the ceiling plates 20 of the first box elements 18L and 18R by a predetermined amount. Further, the height $h_2$ between the floor plates and the ceiling plates is also smaller than the height $h_1$ between the floor plate 19 and the ceiling plate 20 by a predetermined amount.

Thus, the second box elements 22L and 22R can be contained inside the first box elements 18L and 18R in an overlapping relationship.

Figure 10:
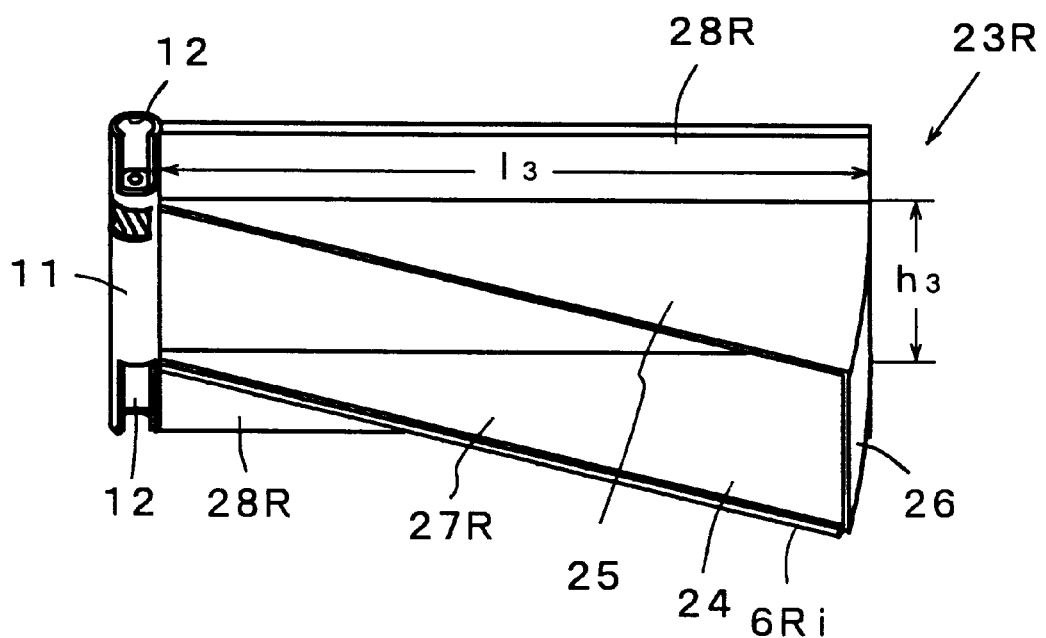
FIG. 10 is a perspective view showing a traction box element 23R from among traction box elements 23L and 23R.

Further, traction box elements 23L and 23R as shown in FIG. 10 are contained inside the second box elements 22L and 22R in an overlapping relationship.

The traction box elements 23L and 23R also have a floor plate 24 and a ceiling plate 25 constituted by fan-shaped plates like the first and second box elements 18 and 22 and a rear wall 26 provided at the ends of the floor plate 24 and the ceiling plate 25.

The length $l_3$ of the sides of the floor plates 24 and the ceiling plates 25 is shorter than the length $l_2$ of the sides of the floor plates and the ceiling plates of the second box elements 22L and 22R by a predetermined amount. Further, the height $h_3$ between the floor plates 24 and the ceiling plates 25 is also smaller than the height $h_2$ between the floor plate 24 and the ceiling plate 25 of the second box elements 22L and 22R by a predetermined amount.

The traction box plates 23L and 23R include downward linkage walls 6Li and 6Ri provided along the inner sides of the floor plates 24 thereof.

Side walls 27L and 27R provided on the outer sides thereof. Only the traction floor plates 9L and 9R are rotatably coupled to the fixed shafts 3L and 3R through cylindrical portions 11 provided on the front ends of the side walls 27L and 27R.

The description on the first embodiment equally applies here in that the cylindrical portions 11 are rotatably coupled to the fixed shafts 3L and 3R in the middle thereof. According to this second embodiment, however, a receptacle portion 12 having an inner diameter substantially equal to the outer diameter of the ring portions 6 of the first and second box elements 18 and 22 is formed not only on the lower ends of the cylindrical portions but also on the upper ends thereof. The receptacle portions 12 are partially cut away over a predetermined angle and to a predetermined height such that they do not interfere with the motion of the first and second box elements 18 and 22.

The operation of the multi-purpose truck according to the second embodiment of the invention will be described.

The multi-purpose truck can normally travel without any difference from a normal truck when the first and second box elements 18 and 22 are contained inside the deck 2 and the ceiling 15 in an overlapping relationship and the traction box elements 23L and 23R are contained inside the second box elements 22L and 22R in an overlapping relationship.

When the hydraulic motor which is not shown is driven after the truck stops at the destination, the cylindrical portions 11 are rotated to pull out the pair of left and right traction box elements 23L and 23R.

When the traction box elements 23L and 23R are pulled out by a predetermined amount, as in the first embodiment, the respective linkage walls 6Li and 6Ri abut the respective linkage walls 6Lo and 6Ro of the second box elements 22L and 22R to pull out the second box elements 22L and 22R.

Further, when the second box elements 22L and 22R are pulled out by a predetermined amount, the respective linkage walls 6Li and 6Ri abut the respective linkage walls 6Lo and 6Ro of the first box elements 18L and 18R to pull out the first box elements 18L and 18R.

Thus, when the hydraulic motor is driven to pull out the traction box elements 23L and 23R, the second box elements 22 and then the first box elements 18 are sequentially telescopically pulled out in a tractive manner to be spread in the form of a fan. Finally, like the first embodiment, they will not be spread any more when the linkage walls 6Li and 6Ri provided on the inner sides of the first box elements 18L and 18R come to positions where they abut stopper walls 14L and 14R provided on the longer sides of the deck 2 as shown in FIG. 8.

Here, a linkage mechanism according to the present invention is again formed by the combination of the linkage walls 6Li, 6Lo, 6Ri, and 6Ro and the stopper walls 14L and 14R. Although the linkage walls 6Li, 6Lo, 6Ri and 6Ro are provided only on the floor plates of the box elements 18, 22 and 23 in this second embodiment, they may be provided also on the ceiling plates.

Figure 8:
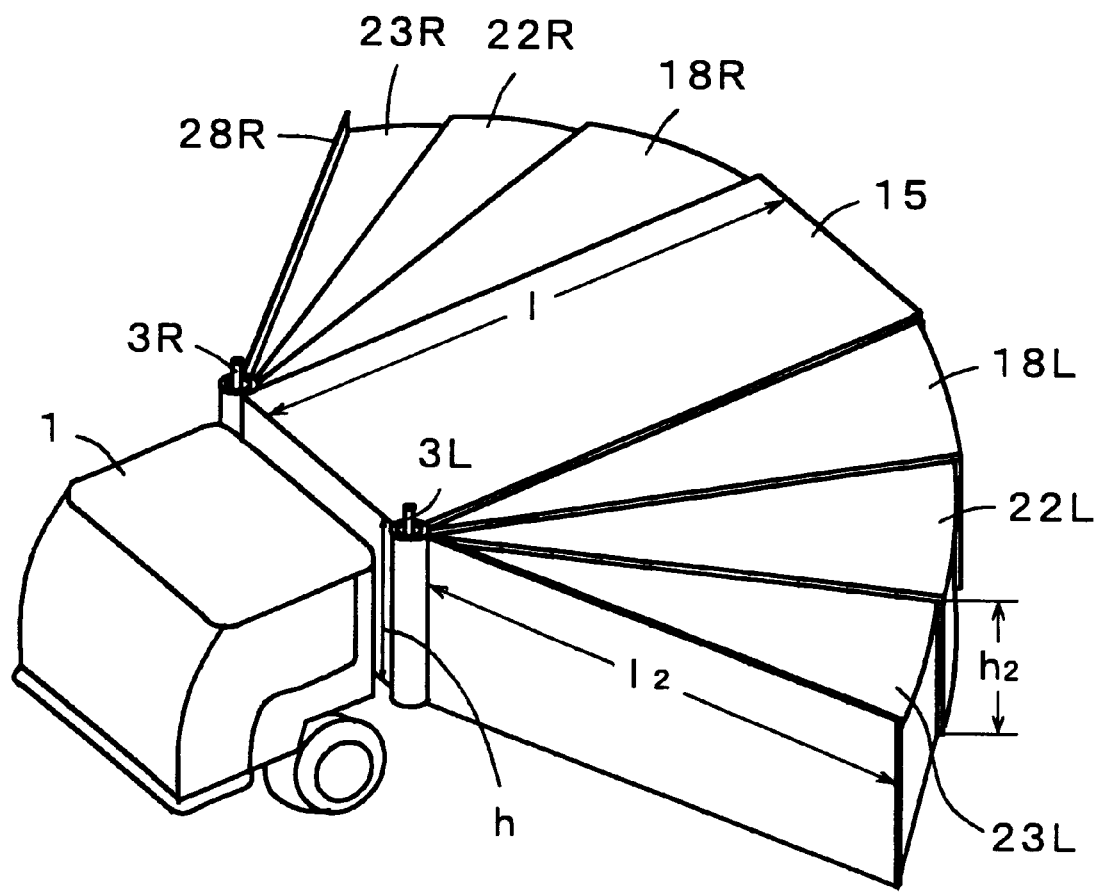
FIG. 8 is a view showing box elements spread in the form of a fan of a multi-purpose truck according to a second embodiment of the present invention.

The floor plates can be retracted from the spread state as shown in FIG. 8 by driving the hydraulic motor to move the pair of left and right traction box elements 23L and 23R inwardly.

As shown in FIG. 10, the upper and lower ends of the side walls 27L and 27R provided on the traction box elements 23L and 23R are extended above and below the traction box elements 23L and 23R plates 9L and 9R, and such extended portions constitute urging portions 28L and 28R. Thus, when the traction box elements 23L and 23R are moved inwardly by a predetermined amount, the urging portions 28L and 28R urge the second and first box elements 22 and 18 sequentially to contain them inside the deck 2 and the ceiling 15.

The multi-purpose truck according to the second embodiment of the invention as described above can offer a larger area which can be used as a space for various purposes, e.g., as a temporary meeting room or a moving hospital in a depopulated area by spreading the box elements 18, 22 and 23.

The truck can travel normally without any interference by the box elements 18, 22 and 23 when they are contained inside the deck 2 and the ceiling 15.

Although fixed shafts 3L and 3R are used in the first and second embodiments, they may be replaced with rotating shafts. In this case, the traction floor plates 9 or traction box elements 23 may be fixed to the rotating shafts.

The number of the floor plates or box elements is not limited to that in the first or second embodiment and may be increased to provide a wider area.

Further, for example, the fixed shafts 3L and 3R may be provided in positions which are point-symmetric about the center of the deck.

Although a truck has been described as an example of a vehicle in which the above first and second embodiment are implemented, the present invention may be applied to any vehicle including small and large trucks without any dimensional limitation.

Figure 11:
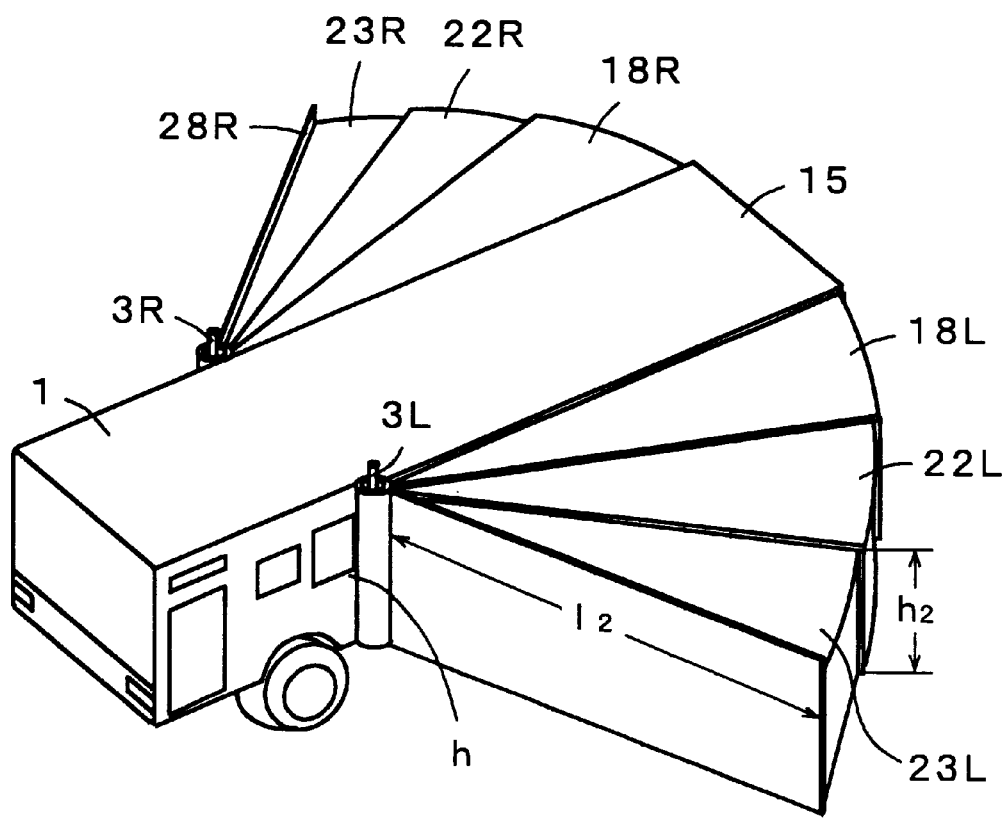
FIG. 11 shows a state in which a bus is used as a vehicle.

Further, instead of a truck, a vehicle such as a bus or a camping car may be modified according to the invention as shown in FIG. 11. In this case, the passenger seats and the like may be removed to provide a space corresponding to the deck 2 as described above.

According to the first and second aspects of the invention, floor plates or box elements can be spread in the form of a fan to provide an increased area which can be used as a multi-purpose space. For example, it may be used as a simple stage according to the first aspect and as a temporary meeting room or a moving hospital in a depopulated area according to the second aspect.

A truck can normally travel without any interference by such floor plates or box elements when they are retracted.

The third aspect of the invention makes it possible to spread the left and right floor plates or box elements according to the first or second aspect of the invention with better balance to provide a wider multi-purpose space.

It should be understood that the foregoing description is only illustrative of the invention. Various alternatives and modifications can be devised by those skilled in the art without departing from the invention. Accordingly, the present invention is intended to embrace all such alternatives, modifications and variants which fall within the scope of the appended claims.

What is claimed is:

1. A multi-purpose vehicle comprising:
    a pair of rotating or fixed shafts mounted vertically to a floor of said vehicle, said pair of shafts being arranged in positions which are symmetric about a center line extending along left and right sides of said floor or about a center of said floor;
    first and second sets of first through n-th floor plates (n≧1) which are each rotatably coupled to a respective one of said rotating or fixed shafts, said floor plates being stacked on said floor and spreadable in the form of fans to the left and right, respectively;
    a traction floor plate which is fixedly or rotatably coupled to each of said rotating or fixed shafts and is stacked on top of the respective uppermost n-th floor plate; and
    linkage mechanisms for linking a floor plate with the floor plate thereunder to pull out the underlying floor plate when the overlying floor plate is pulled out by a predetermined amount, wherein when each of said traction floor plates is pulled out, said respective set of first through n-th floor plates are sequentially pulled out through said linkage mechanisms beginning with said n-th floor plate to spread those floor plates in the form of a fan.

2. The vehicle of claim 1, wherein said floor is a deck connected to the vehicle.

3. The vehicle of claim 1, wherein said pair of shafts are arranged in positions symmetric about the center line extending along left and right sides of said floor.

4. The vehicle of claim 1, wherein said pair of shafts are arranged in positions symmetric about the center of said floor.

5. The vehicle of claim 1, wherein said shafts are rotatable.

6. The vehicle of claim 1, wherein said shafts are fixed.

7. The vehicle of claim 1, wherein said traction floor plates are fixedly coupled to the respective one of said shafts.

8. The vehicle of claim 1, wherein said traction floor plates are rotatably coupled to the respective one of said shafts.

9. A multi-purpose vehicle comprising:
    a pair of rotating or fixed shafts mounted vertically between a floor of said vehicle and a ceiling facing said floor, said pair of shafts being arranged in positions which are symmetric about a center line extending along left and right sides of said floor or about a center of said floor;

first and second sets of first through n-th box elements (n≧1) which are each rotatably coupled to a respective one of said rotating or fixed shafts, said box elements being contained inside said floor and said ceiling in an overlapping relationship and spreadable in the form of fans to the left and right, respectively;

a traction box element which is fixedly or rotatably coupled to each of said rotating or fixed shafts and is contained inside the respective innermost n-th box element in an overlapping relationship; and linkage mechanisms for linking an inner box element with the outer box element next thereto to pull out the outer box element when the inner box element is pulled out by a predetermined amount, wherein when each of said traction box elements is pulled out, said respective set of first through n-th box elements are sequentially pulled out telescopically beginning with the n-th box element through said linkage mechanisms to spread those box elements in the form of a fan.

10. The vehicle of claim 2, wherein said floor is a deck connected to the vehicle.

11. The vehicle of claim 2, wherein said pair of shafts are arranged in positions symmetric about the center line extending along left and right sides of said floor.

12. The vehicle of claim 2, wherein said pair of shafts are arranged in positions symmetric about the center of said floor.

13. The vehicle of claim 2, wherein said shafts are rotatable.

14. The vehicle of claim 2, wherein said shafts are fixed.

15. The vehicle of claim 2, wherein said traction box elements are fixedly coupled to the respective one of said shafts.

16. The vehicle of claim 2, wherein said traction box elements are rotatably coupled to the respective one of said shafts.

* * * * *